United States Patent [19]
Carlson

[11] 4,432,733
[45] Feb. 21, 1984

[54] AMUSEMENT AND EDUCATIONAL GAME

[75] Inventor: Albert W. D. Carlson, Roosevelt Island, N.Y.

[73] Assignee: Rivercross Learning Corp., Roosevelt Island, N.Y.

[21] Appl. No.: 338,033

[22] Filed: Jan. 8, 1982

[51] Int. Cl.³ .............................................. G09B 7/02
[52] U.S. Cl. .................................................. 434/339
[58] Field of Search ................ 273/139; 434/339, 340, 434/338, 341, 343, 344

[56] References Cited

U.S. PATENT DOCUMENTS

| | | | |
|---|---|---|---|
| 2,997,793 | 8/1961 | Kelly | 434/339 |
| 3,100,352 | 8/1963 | Boissevain | 434/338 |
| 3,579,857 | 5/1971 | Lamberson | 434/339 |
| 3,699,668 | 10/1972 | Tesar | 434/340 |
| 3,763,574 | 10/1973 | Rose | 434/339 |
| 3,800,437 | 4/1974 | Lamberson | 434/339 |
| 3,947,987 | 4/1976 | Clark et al. | 434/339 |
| 4,020,430 | 4/1977 | Vander Heyden | 333/79 |
| 4,024,953 | 5/1977 | Nailor | 206/334 |
| 4,115,931 | 9/1978 | Futhey | 434/341 |
| 4,121,355 | 10/1978 | Kimoto et al. | 434/340 |
| 4,229,686 | 10/1980 | Mullersman et al. | 320/2 |
| 4,310,318 | 1/1982 | Carlson | 273/1 E X |

*Primary Examiner*—William H. Grieb
*Attorney, Agent, or Firm*—Darby & Darby

[57] ABSTRACT

An amusement game formed by a base having a well therein to receive a power source, such as a battery, and a platform on which a pre-printed circuit card of conductors is located with the card having an upwardly bent portion which extends over a corresponding portion on the base and which also carries a plurality of light emitting diodes. A cover overlies the printed circuit card with the cover having a cutout providing access to a plurality of pairs of terminals of the printed circuit each of which is designed to activate an LED with a activating card having conductive material thereon to cause a corresponding pair of terminals to be activated.

5 Claims, 4 Drawing Figures

AMUSEMENT AND EDUCATIONAL GAME

BACKGROUND OF THE INVENTION

Various types of amusement and educational games utilize a printed circuit board with a pre-printed pattern of electrical conductors thereon to control a single indicator, such as a sounder or a light. Such games have generally been formed by a conventional printed circuit board which is made of a hard and relatively inflexible phenolic or other plastic material. While such games are functional, they have limitations from the point of view of playing ability and are also somewhat expensive in the production of the printed circuit board.

BRIEF DESCRIPTION OF THE INVENTION

The present invention relates to an amusement game of a novel construction and which also can be produced relatively inexpensively. In accordance with the invention, a predetermined pattern of electrical conductors is printed by conventional printing techniques, using electrically conductive ink on a template which is flexible and which can be bent. The pattern of conductors includes a plurality of pairs of terminals which are in series with a battery, which each pair of terminals controlling the actuation of a corresponding indicator device, preferably a light emitting diode. The pattern of conductors also includes the terminals for the battery. The flexible material of the template permits it to be folded so that it can be placed on a base with the light emitting devices at an upwardly angled position where they can be more readily viewed. The base also has a well cut out to receive the terminals for the battery and the curved part of the template with the indicating devices thereon.

The template is covered by a mask which leaves only the terminals exposed in a window area which corresponds to a playing or actuating card. The conductor terminals are also preferably hidden by printing the template in the window area with ink of the same color as the terminals. The card has switching bits of electrically conductive ink printed on one surface in a predetermined location or locations corresponding to one or more of the pairs of terminals. Pressure upon the other surface of the card will complete the circuit with the battery and cause one of the indicating devices to be actuated.

OBJECTS OF THE INVENTION

It is, therefore, an object of the present invention to provide a novel amusement and educational device having a plurality of individually actuatable indicators.

A further object is to provide an amusement device having a plurality of indicators in the form of LED's which are located on and connected to a template having a printed circuit pattern thereon, with the template being formed of a flexible material which can be bent to place the indicators at a desired viewing position.

Another object is to provide an amusement device having a base and a template with a printed circuit pattern thereon with the template including terminals for connection to a battery which is to be housed in a well in the base and a curved portion on which viewable light emitting devices are to be placed.

An additional object is to provide an amusement device having a template on which is laid downward by a printing technique a plurality of conductors each of which is connected in series with a battery and an LED, each conductor having a terminal which is adjacent to a common terminal and a data card which is formed to complete the circuit between one of the terminals and the battery so as to actuate a corresponding LED.

BRIEF DESCRIPTION OF DRAWING

Other objects and advantages of the present invention will become more apparent upon reference to the following specification and annexed drawings in which:

Referring to FIGS. 1-3, the amusement device 10 includes a base 12 which is preferably formed of a suitable plastic material such as by injection molding or vacuum forming. The base includes a main platform area 14 having a depressed well 16 therein in the shape of a battery or batteries to be held therein. An upwardly angled back 18 extends from the rear of platform 14. The back 18 is inset from side panels 20 which also extend along the sides of platform 14 and which terminates at a front panel 21, shown as sloping forwardly, which also extends above the platform 14.

Figure 1:
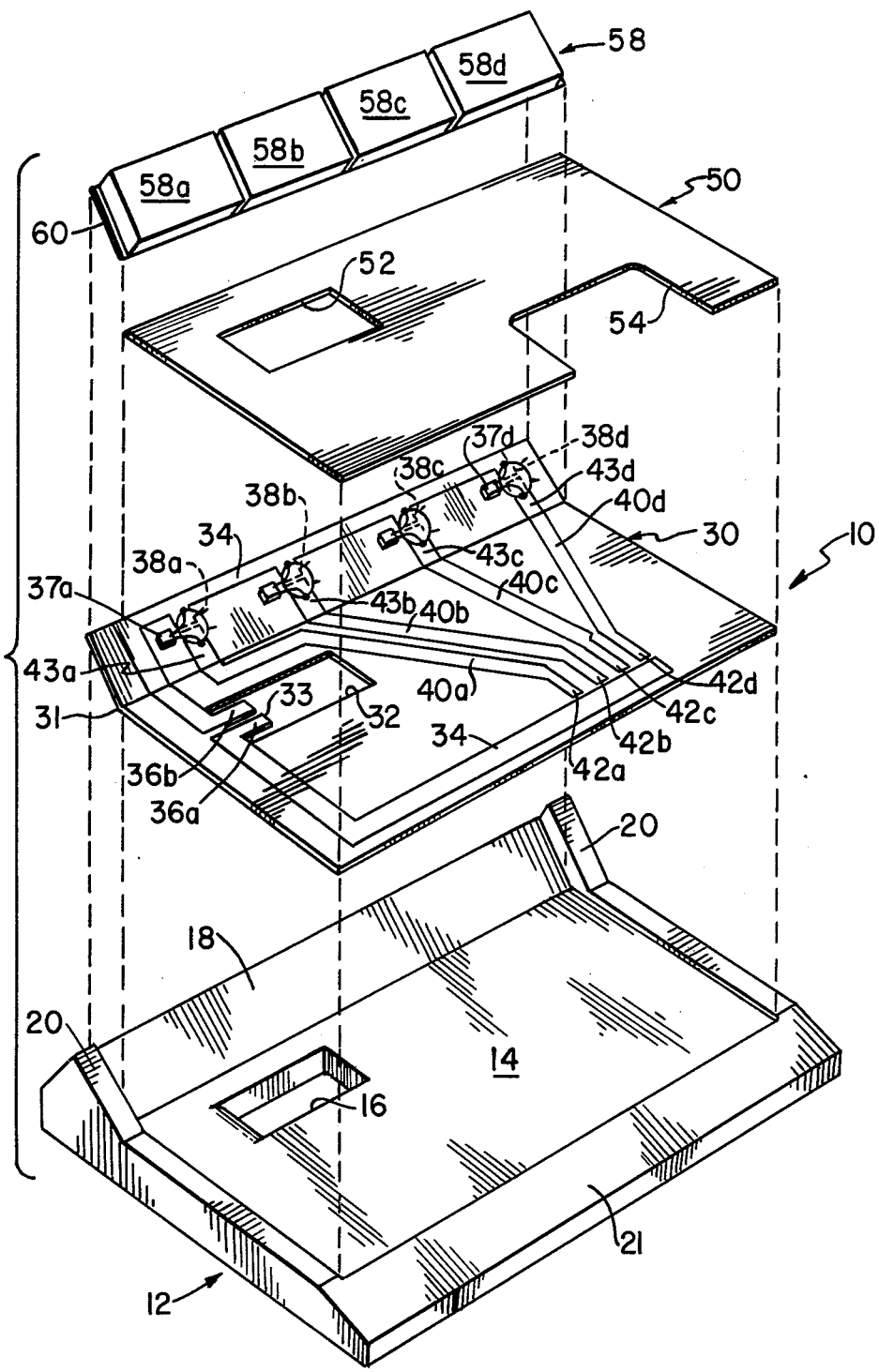
FIG. 1 is an exploded perspective view of the amusement device according to the invention.

A template 30 is provided which is to be placed on the platform 14 and on the back 18 between the side panels 20 and front panel 21. The template 30 can be of any suitable material which is flexible, for example, paper, cardboard, Mylar, an oaktag type material, etc. The template 30 is of generally rectangular shape, although any suitable shape can be utilized. It has an opening 32 with an extending tab 33 cut therein, for example, by diecutting, to accept a battery, as described below.

Laid down on the top surface of the template 30 is a pattern of conductors which will be described in greater detail below. The conductors are laid down by a printing process such as, for example, rotogravure, offset printing, lithography, silk screen, letterpress, etc. The conductors are of a conductive ink which is, for example, a mixture of carbon and nickel particles or carbon and silver, or carbon and some other metallic material. The proportions of the metal and carbon are selected to achieve a desired amount of electrical conductivity. An ink of higher or electrical conductivity, that is, one containing more metal, is more expensive than if a greater amount of carbon is utilized.

The pattern of conductors includes a first main conductor 34 which starts as the lower edge of the template near the righthand edge and proceeds along the lower edge to the lefthand edge and then turns onto tab 33 and terminates in a pad 36a to form one of the terminals for a battery. The main conductor 34 then continues with a second pad 36b on tab 33 for the other terminal of the battery and extends upwardly and along the top edge of the template 30.

A plurality of branch arms 38a, 38b, 38c and 38d, here illustratively shown as four, although more or less can be used, extend downwardly for a short distance from the main conductor 34 along the top of the template. A plurality of conductors 40a through 40d, of a like number corresponding to the branch arms 38a through 38d, extend across the central part of the template. Each conductor 40 has a respective terminal end 42a through 42d which lies adjacent to the main conductor 34 at the bottom of the template and a respective terminal end 43a through 43d which lies adjacent a respective branch arm 38a through 38d.

As seen in FIG. 1, an indicating device, here illustratively shown as a light emitting diode (LED) 37, has one of its leads connected to one of the branch arms 38a through 38d and the other of its leads connected to the corrrespending one of the ends 43a through 43d of the respective conductors 40a through 40d. The connection of the LED leads can be by stapling, soldering or the leads can be taped to the conductors. Thus, if a battery is connected across the terminals 36a, 36b and there is a connection between one of the terminal ends 42a through 42d of the conductors 40a through 40d, and the main conductor 34, the circuit to the respective LED will be completed and the LED will be energized. In essence, there are a plurality of LEDs, each one being adapted to be connected across the battery to be separately energized. That is, the LEDs are all in parallel across the battery in a respective separate circuit formed by a conductor 40 and the circuit for each conductor 40 is closed.

As described below, the battery to be used is a conventional 9 volt battery. Other battery sizes can be used. An LED generally has a preferred operating range of about 3–4 volts and the use of a voltage above this range decreases the life of the LED and voltage below this range will not be sufficient to energize on LED. Normally, a fixed voltage dropping resistor is provided in series between the LED and the battery. The use of such a resistor, which adds expense both for the component and in the assembly, is eliminated in the present invention by formulating the ink for the conductors 34 and 40 and/or the size (width) of these conductors to produce a decreased resistance in series with each LED. That is, by using a less conductive ink, more resistance is obtained. Also, by making the conductors narrower, more resistance is obtained. As should be understood, the game is constructed without the need for components such as transistors, resistors, capacitors, etc.

It is preferred that the template 30 be partially overprinted at least in the area of the window 54 with non-conductive ink of a color to camouflage the conductors 34, 40, 42. For example, if the conductive ink is black, the other ink will also be black in the spaces between the conductors. The user of the device will therefore not be as aware of the various conductors or the conductors will be substantially camouflaged.

The template 30, being of a flexible material, is bent upwardly on line 31 so that the upper section of the template 30 bearing the LED's 38 thereon can rest on the rear 18 of the base.

The part of template 30 below line 31 is covered by a mask 50 which can be of any suitable material, for example, paper, cardboard or plastic. The mask is preferably of opaque material and has an opening 52 cut out which corresponds to the opening 32 of template 30 and also to the well 16 in the base. There is also cut out a window 54 at a position corresponding to the set of terminal tabs 42 of the conductors 40.

The assembly is completed by a bezel 58 which can be thermoformed from a translucent plastic material. The bezel has a number of compartments 58a through 58d each corresponding to and to be positioned over a respective LED. The bezel has arms 60 at each end thereof so that it can snap into the angled panels 20. If desired, the bezel can be held in place by an adhesive.

Figure 4:
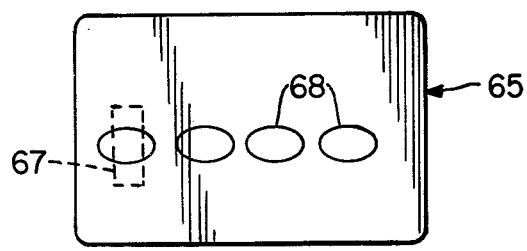
FIG. 4 is a perspective view of the card.

FIG. 4 shows a data card 65 which is utilized. The data card is also of any conventional material, for example, paper or cardboard. It has printed thereon at one or more predetermined areas 67 a switching bit of electrically conductive ink. This can also be of the same type of ink used for the conductors of the template 30. The switching bits 67 are placed at predetermined locations. When printing the cards 65, a large number can be gang printed at the same time on a single sheet and then cut therefrom or else individual cards can be printed. The position of the switching bits 67 during gang printing can be at the same or different locations on the various cards. The side of the data card with the switching bits is also preferably printed with a non-conductive ink in similar patterns to give a false pattern of data bits or partially overprinted to camouflage the data bits.

Figure 2:
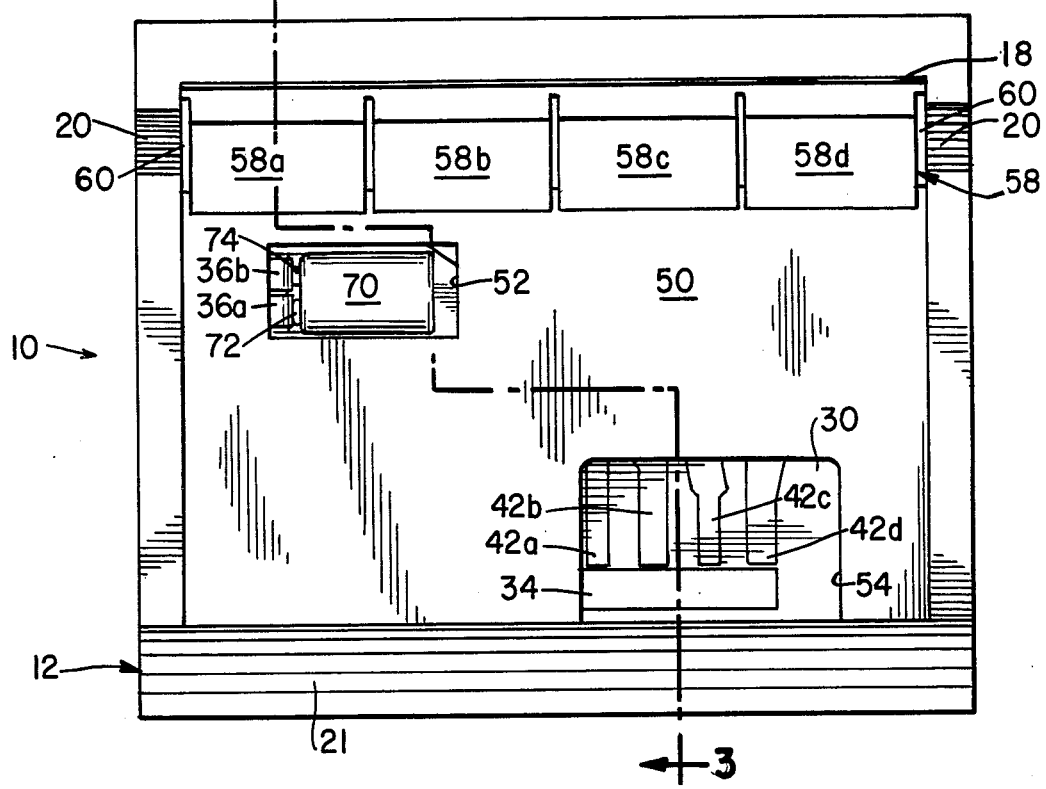
FIG. 2 is a top view.
Figure 3:
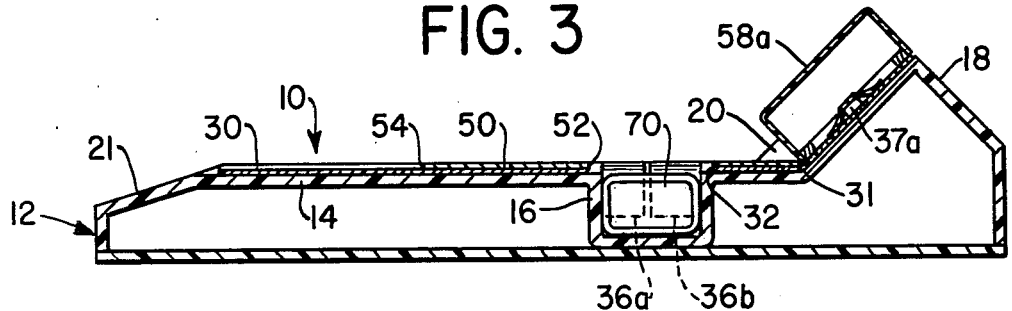
FIG. 3 is a side elevational view in cross section along lines 3—3 of FIG. 2.

FIGS. 2 and 3 show the assembled unit. The template 30 is laid on the base with a portion above line 31 bent upwardly to rest on its back 18. The LED's have been pre-connected to the conductors. An adhesive can be used to hold the template to the base. The mask 50 covers the template 30 and can be held thereto by an adhesive. A battery 70, shown as being a conventional 9 volt battery having terminals 72 and 74, is placed in the well 16. The tab 33 of the template is bent down and rests against one of the walls of well 16 so that the contact pads 36a, 36a, 36b of the template make good contact with the battery teminals 72 and 74.

The bezel 58 is placed on the back 18 to cover the LEDs 38 with each of bezel compartment 58a through 58d providing an individual area to be illuminated when a respective LED is energized.

As seen in FIG. 2, the terminal pad portions 42a through 42d extend through the pocket or window 54 as does the lower righthand end of the main conductor 34. As previously explained, the user cannot see the pattern of conductors 42a through 42d and 34 since this has been partially masked by an overprinting of ink of a color compatible to that of the conductors, the masking ink being non-conductive.

In playing the game, the player is provided with one or more of the cards 65. He then places the card into the window 54 with precise alignment being provided by the edges of the mask 50. The player than moves his finger over the top of the card and applies pressure thereto. The card is preferably provided with indicia defining a number of finger pressure areas 68 corresponding to an area where a switching bit 67 would be located which is capable of bridging one of the contact arms 42a through 42d and the main conductor 34. If such a bit is provided at the particular place, then the circuit will be completed and the corresponding LED connected to the terminal 42 and conductor 40 will be energized.

The device has advantages both from the point of view of a game of chance and also an educational game. For example, in the case of a game of chance, a player is given a particular sweepstakes card with a switching bit 67 printed thereon. The card may be distributed as a rebate offer, sweepstakes entry form, magazine insert, free-standing insert direct mail piece or in-store promotion. The player then places the card in the window 54 and then touches the various places 68 on the card corresponding to the appropriate places for the bits to be located. If a particular LED 38 is illuminated, then the player is given an award, points, cents-off purchase, rebate, prize, etc.

In the educational aspect, a multiple choice question can be printed on the top of a card and each one of the touch areas 68 corresponding to one answer part of the multiple choice. The player would then press the area of his choice and he would be told whether the question has been answered correctly by the energization of the light.

What is claimed is:

1. An electrically operated game comprising:
   a base having a platform,
   a template of flexible material having a pattern of electrical conductors laid down thereon, including a first and a second conductor each having a terminal for connection to a source of power,
   a plurality of individual branch conductors connected in parallel with said first conductor, each said branch conductor including a light emitting diode and having an end adjacent said second conductor,
   and a card having printed thereon at least one bit of conductive ink which is adapted to bridge and make electrical connection between said one of said ends of said branch conductors and said second conductor to energize the respective LED of the branch conductor, and
   a mask for covering said template, said mask having a cutout defining a window in the area where said ends of said branch conductors are adjacent said second conductor, the edges of the mask surrounding said window providing a guide for a card.

2. A game as in claim 1 wherein said base has an upwardly extending rear portion, said template being of flexible material with the portion thereof having the light emitting diodes thereon being upwardly bent to lie on said rear portion.

3. A game as in claim 2 further comprising a bezel of light transmitting material for said rear portion of base and overlying said light emitting diodes.

4. A game as in claim 1 wherein the conductors are printed on the template with a conductive ink.

5. A game as in claim 4 wherein the conductor size and the ink composition have a predetermined resistance corresponding to the operating voltage of a light emitting diode and the operating voltage of the source of power.

* * * * *